Feb. 11, 1958   D. A. BUNNELL ET AL   2,823,153
MEANS FOR THREADING WIRES THROUGH FLEXIBLE TUBING
Filed Oct. 7, 1953   2 Sheets-Sheet 1

INVENTORS
DONALD A. BUNNELL
ROBY G. L. PEAK
By George C. Sullivan
    Agent

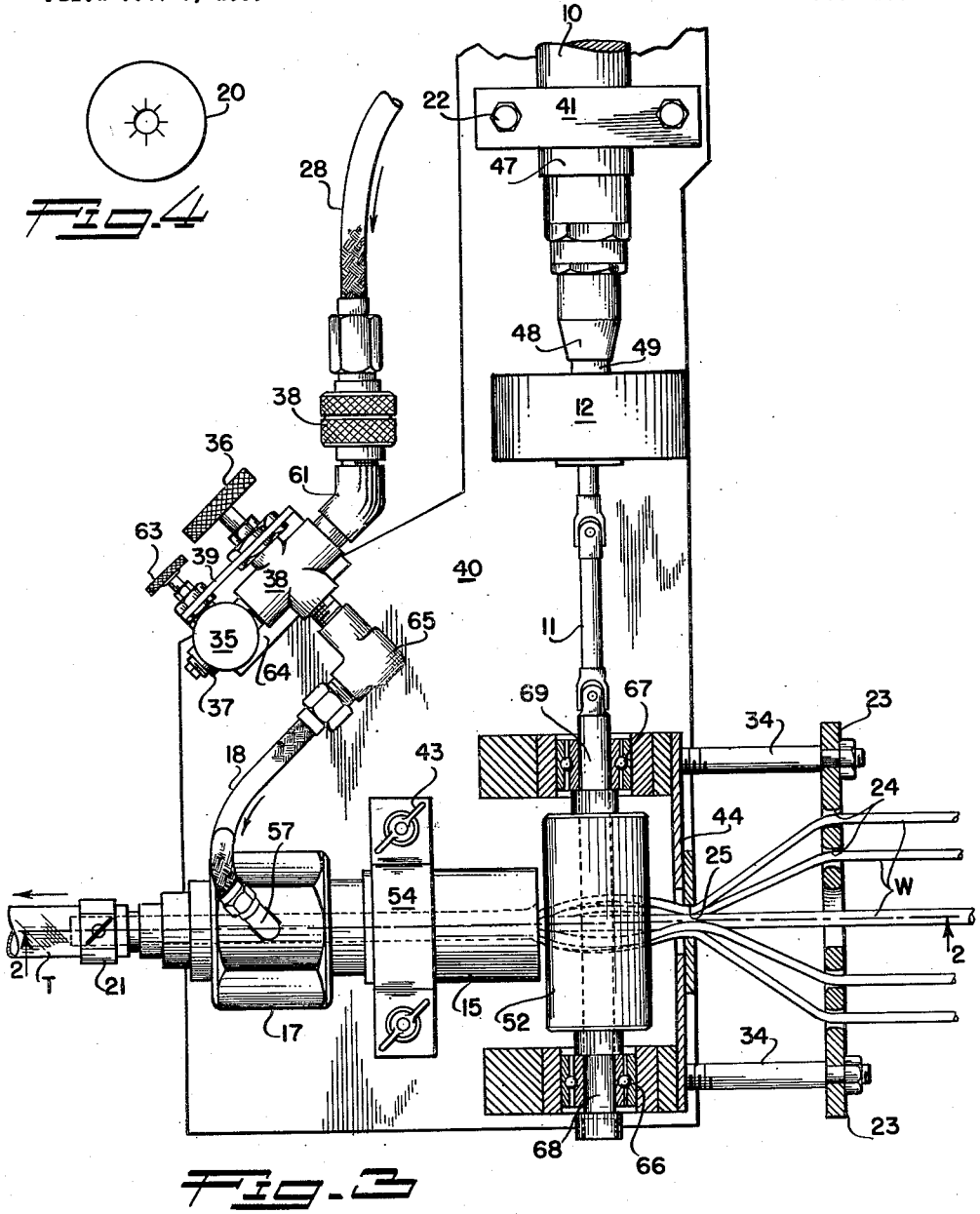

United States Patent Office 2,823,153
Patented Feb. 11, 1958

2,823,153

MEANS FOR THREADING WIRES THROUGH FLEXIBLE TUBING

Donald A. Bunnell and Roby G. L. Peak, Los Angeles, Calif., assignors to Lockheed Aircraft Service, Inc., Burbank, Calif.

Application October 7, 1953, Serial No. 384,686

5 Claims. (Cl. 154—2.26)

This invention relates to the insulating of wires or cables and pertains especially to a method and an apparatus for threading wires and cables through flexible expandable tubes, or the like.

It is necessary in the manufacture of aircraft that electrical conductors, wires, cables, etc. be used extensively throughout the said aircraft as a means of furnishing electrical power. The quantity of the power or signal may vary from a very minute amount to one of a very large magnitude. The cables or wires so used must be adequately protected or insulated in order that the operation of the aircraft and the associated equipment used therein will not be interrupted due to a break or short in the wires or cables. Such cabling is, as a rule, fabricated by the aircraft manufacturer as the need may arise and are so fabricated according to specific specifications and requirements.

It has been the practice, heretofore, to thread the wires through the protective coverings by hand. This hand-threading process is slow and tedious and, as a result, materially increases the cost of the cabling and the product of the aircraft manufacturers, the airplane. The cabling used in aircraft may vary from one wire to a group or assembly of many wires. The group or assembly of wires may vary in themselves as to their individual size or gage. This wide variation of numbers and sizes calls for extra handling and treatment which, together with the slow threading process, increases the cost of manufacturing of the aircraft.

In the threading operation heretofore mentioned the bundle or group of wires are strapped or tied together at suitable points throughout their length. A cord or string is run through the tubing by introducing into one open end of the tubing the string or cord and then using pressurized air to blow the cord or string through the tube. To this cord or string threaded trough the tube a wire is attached and pulled through the tube. At this stage of the threading operation a considerable amount of handling has already been applied to the process. The pull wire now threaded through the tube is attached to the bundle or assembly of wires to be protected or insulated and the bundle or assembly of wires is pulled through the protective tube. At all times during the process above described caution must be exercised in order to keep the tubing and the bundle or assembly of wires from kinking. It is often a requirement that the wires fit closely within the protective tubing and this close fit necessitates the utilization of additional manpower in order to process the wires or cable into the tubing.

It is an object of this invention to provide a practical, expeditious apparatus for threading bundles or assemblies of wires through flexible and expansible tubing. In actual operations one man, by employing the apparatus of this invention, may readily thread a bundle or assembly of wires through flexible plastic tubing. Two or more men would be required for this same operation if the standard or customary procedure is used.

Another object of this invention is to eliminate some of the aforementioned operations. In particular, this invention eliminates the necessity of tying the bundle or assembly of wires together before threading the said wires through the tubing. The invention also eliminates the necessity of first threading a cord, string or wire through the tube preparatory to entering the bundle or assembly of wires into the said tubing.

Another object of this invention is to provide an operational method that can be performed in full by one operator without a great amount of skill or training.

A still further object of this invention is to provide a machine that is time saving over the process heretofore used. In actual operation one man, by employing the apparatus of this invention, may readily thread a bundle or assembly of wires through a flexible elastic tube in approximately two to five minutes, whereas, heretofore, two or more men were required and from one to two hours were needed to manually perform the same identical threading operation.

A still further object of this invention is to provide a machine of the kind mentioned that is practical and easy to operate. The machine is simple in its operation and has relatively few points of possible malfunction. There are few adjustments necessary in its operation and those found necessary do not require the exercising of a great amount of technical skill or ability.

Other objects and features of the invention will become apparent from the following detailed description of a typical apparatus of the invention wherein reference will be made to the accompanying drawings, wherein:

Figure 3 is a plan view of the apparatus of the invention; and

Figure 4 is a plan view of the rubber seal.

The machine of the invention may be said to include generally a base 40, a wire guide plate 23, a pair of counter-rotating rolls 13 and 52 for advancing the wires, a seal assembly block 15 receiving the wires from the rolls, means for restraining and inflating the tube T to fully receive the wires W and other elements to be later described.

Figure 1:
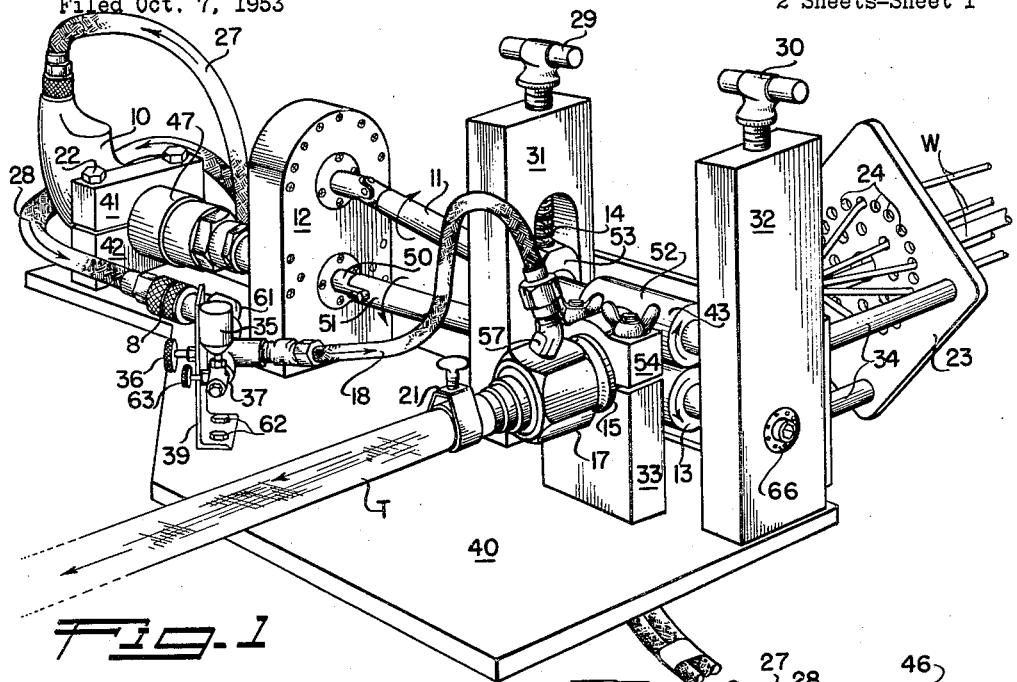
Figure 1 is an isometric view of the apparatus of the invention.

The apparatus of the invention includes an air motor 10, Figure 1, positioned and held in its operating position by motor clamps 41 and 42. The said motor clamps 41 and 42 are joined together and around the barrel 47 of the motor 120 and held in place by means of the motor clamp retaining bolts 22, said bolts 22 being threaded into the base plae 40. The chuck 48, shown in Figure 3, of the air motor 10 is engaged with an axle 49 which is a part of the roller 13, said axle extending from a roller drive gear box 12. The roller drive gear box 12 contains reduction gears by means of which the air motor 10, through the axle 49 transmits relative movement to the shafts 11 and 50. The lower shaft 50, Figure 1, is coupled directly to the air motor 10 through the axle 49 and chuck 48. A sleeve 51 is utilized on the shaft 50 to facilitate the disassembly of the apparatus.

The shafts 11 and 50 rotate at the same speed but in opposite directions, as indicated by the arrows in Figure 1. The speed of rotation is controlled by reduction gears in the roller drive gear box 12. The shafts 11 and 50 are connected to rollers 13 and 52. The rollers 13 and 52 are held in position by means of a plate assembly 31 and an end plate assembly 32. Bearings 66 and 67 are located in the said end plates 31 and 32 in which the shafts 68 and 69 of the rollers 13 and 52 rotate.

The rollers 13 and 52 are urged toward one another by means of roller tension adjusting screws 29 and 30 which are threaded in the plate assembly 31 and the end plate assembly 32 respectively. The roller tension adjusting screw 29, located in the end plate assembly 31, acts with a screw spring 14 to apply necessary adjusting movement to the roller carrier block 53 which acts upon the roller 52 in its cooperative arrangement with the roller 13. A similar adjusting arrarngement is also provided in the end plate assembly 32. The necessity and utilization of this adjustment will be hereinafter explained in the description of the operation of this invention. The rollers 13 and 52 are held by the plate assemblies 31 and 32 in such a position as to maintain their longitudinal axes in parallel relationship.

Referring to Figure 1, there is shown a plate 23 through which a circular series of spaced openings 24 have been perforated. This plate 23, or wire comb, is attached to the end plate assembly 32 and the wire guide plate 44 by means of suitable spacing rods 34.

Still referring to Figure 1, there is shown the two parts of the seal assembly block clamp 33 and 54 which is used to position and secure the seal assembly block 15 in place. The seal assembly block clamps 33 and 54 are adjusted by means of a seal assembly block clamp adjusting nut 43. The seal assembly block 15, referring now to Figure 2, has a hole 16 located longitudinally through it to be used as a wire guide. The wire guide function will be hereinafter explained in the description of the operation of the invention. The said seal assembly block 15 is positioned with one end near the rollers 13 and 52, the other end being externally threaded, the threads 55 being used to attach a manifold 17 to the seal assembly block 15. The seal assembly block 15, the manifold 17, and the port block 58, which is removable as a unit B, is held at right angles to the longitudinal axis of the rollers 13 and 52 and parallel with the contiguity of the periphery of the said rollers 13 and 52 by means of the plate assemblies 31 and 32.

Figure 2:
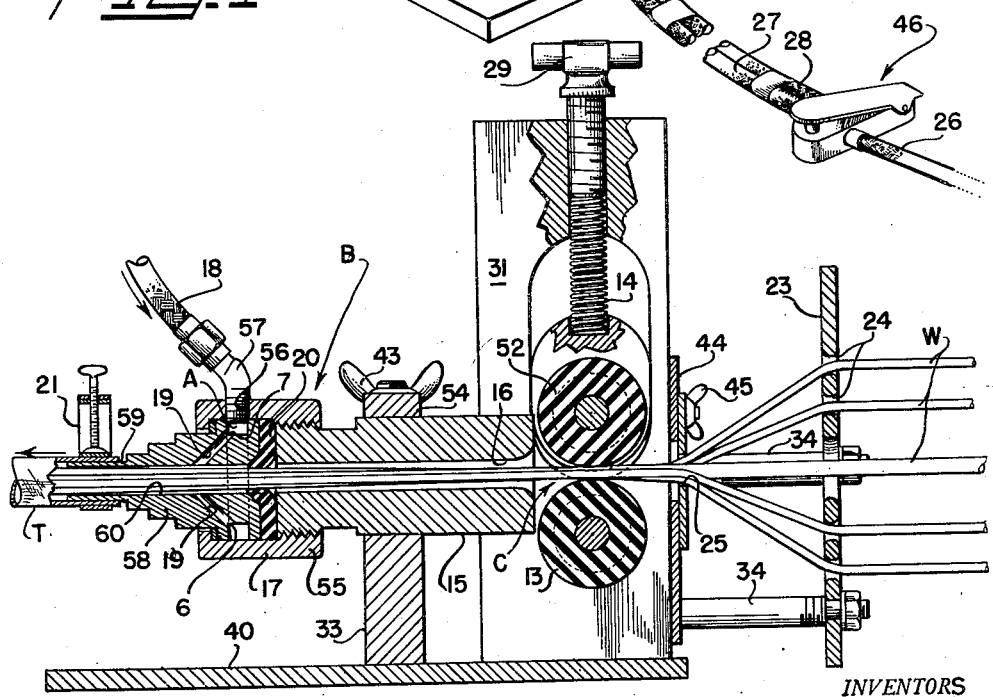
Figure 2 is a side elevation of the apparatus of the invention taken at line 2—2 on Figure 3.

Within the body of the manifold 17, still referring to Figure 2, there is located a seal 20. The said seal 20 is positioned between the threaded end of the seal assembly block 15 and a port block 58. A threaded radial hole 56 is shown punched through the manifold 17 casing by which means the air line fitting 57 is attached. The manifold 17 holds the port block 58 against the seal assembly block 15 with the seal 20 positioned between the two.

Continuing with Figure 2, there is shown angular ports 19 within the port block 58. The angular ports 19 are shown situated at a point adjacent to the hole 56 in the manifold 17 and running at an angle away from the end of the port block 58 that retains the seal 20, said angular ports 19 opening into the port block hole 60. The annular area A, shown within the manifold 17 and the port block 58 is the air distribution chamber by which means the air under pressure from the air line 18 is introduced into the ports 19 through the port openings 6 and 7.

There is shown, Figure 2, an elongated portion or tip 59 of the port block 58 over which the elastomer tubing T is fitted. An air tight junction between the tubing T and the tip 59 is assured by means of an adjustable tube clamp 21.

Again referring to Figure 1, a treadle valve 46 is shown with an air line 26 terminating therein. Air line 26 supplies air under pressure to the apparatus of this invention by two other air lines 27 and 28 originating at and attached to the treadle valve 46, said treadle valve 46 serving as a means of regulating the pressurized air flow. Air line 27 terminates at an air motor 10 by which means the necessary motive power or rotative movement of the rollers 13 and 52, heretofore mentioned, is obtained. The rollers 13 and 52 being fabricated from a suitable compressible and durable material. The air line 28, that likewise originates at the treadle valve 46, terminates, Figure 3, in coupling 8. The coupling 8 is, in turn, joined to an elbow 61, the elbow 61 being the means of connecting the air line 28 and the coupling 8 to the air valve 38.

The air valve 38, Figure 3, which is in the nature of an adjustable restrictor, is used to regulate the flow of air into the angular ports 19. The air valve 38 is adjusted by means of a knob 36. The said air valve 38 is mounted on a valve support bracket 39 which is attached to the floor plate 40 by means of two bracket attaching screws 62, Figure 1. Mounted adjacent to the air valve 38 is a container 35 used to store a suitable lubricating powder such as talc, or the like. The dispensing of said lubricating powder is regulated by a lubricating powder control valve 37. The said lubricating powder control valve 37 is adjustable by means of a lubricating powder control valve adjusting knob 63. The container 35 and its associated valve 37 are likewise mounted on the valve support bracket 39. The lubricating powder control valve 37 and the air valve 38 are connected by means of an air pressure conducting joint section 64. The air valve 38 is connected to the manifold 17 by means of an air line 18, through an elbow 65, an air line fitting 57, into the hole 56 in the manifold 17.

In the following description of the operation of this invention a multiplicity or plurality of wires will be used in the threading process. However, a single wire may be so threaded, as can be readily seen, and nothing in this description is intended to imply any limitations as to the number or sizes of wires so threaded.

The wires W are gathered together in whatever numbers and sizes the cable specifications may specify. A tube T of the desired size to shield or insulate the wires W to be threaded therein is selected and attached to the tip 59. In carrying out the process of the present invention, wires W are run through the holes 24 in the wire comb 23. This step of running the wires W through the wire comb 23 serves to keep the wires from kinking or tangling and facilitates the handling of a multiplicity of wires. The ends of the wires W are next run through the opening 25 in the wire guide plate 44 so as to place the wires in the correct position to be acted upon by the counter-rotating rollers 13 and 52. The tube T through which the wires W are to be threaded is fitted over the tip 59 and secured by means of the adjustable tube clamp 21. A wide variety of tube sizes may be used with this apparatus as may be necessary in order to protect and insulate a wide variety of wire sizes and numbers. The seal assembly block 15, the manifold 17, and the port block 58 are removable, as heretofore mentioned, as a unit B by releasing the seal assembly block clamp 54. Units B of different sizes may be substituted in order to handle the various sizes of wires W and tubing T called for in the airplane specifications.

At the present stage of the operational description, the wires W are situated in the correct position to be acted upon by the rollers 13 and 52, and the correct size tubing T has been fitted over the tip 59 of the port block 58. Compressed air is delivered to the air motor 10 through the air line 27 which is connected to the treadle valve 46. Activation of the treadle valve 46 regulates the flow of pressurized air to the air motor 10 and also controls the time duration of the air flow. The air under pressure is obtained from any desirable source or container, or the like.

The air motor 10 which is connected to the axle 49 by means of the chuck 48 turns the gears located in the roller drive gear box 12. Roller 13 is coupled directly to the rotation of the air motor 10 and in this embodiment rotates in a counter-clockwise direction. Roller 52 through the gears in the gear box 12 rotates in a clockwise direction. The wires W to be threaded are urged into the area C between the two rotating rollers. Adjustment is made to the roller tension adjusting screws 29 and 30 until the wires W are firmly engaged between the two rotating rollers 13 and 52. At this point the wires W are being pulled through the wire comb 23 and run into and through the hole 16 in the seal assembly block 15.

At the same time air is being furnished to the air motor 10, air is also being supplied by means of the air line 28 to the air valve 38. The said air valve 38 regulates the flow of air through the air line 18 into the angular ports 19. The air thus flowing through the angular ports 19 into the port block hole 60 serves to inflate or expand the tube T previously attached to the tip 59 of the port block 58. The expansion of the tube T by the pressurized air allows the wires W to readily progress through the tube T as urged along by the heretofore mentioned rotation of the rollers 13 and 52. The expansion or inflation of the tube T under pressure will permit the use of a smaller size tube than would ordinarily be used, and, as a result, when the threading process is completed, the fabricated cable is firm and compact. The threading process through the tube T is assisted by the use of a suitable lubricating powder which is introduced into the air valve 38 by means of the joint section 64. The said lubricating powder is stored in the lubricating powder container 35. The lubricating powder introduction into the air valve 38 is controlled and regulated by the knob 63 attached to the lubricating powder control valve 37. The seal 20 located between the pork block 58 and the seal assembly block 15 prevents an excessive or undesirable amount of pressurized air from escaping through the opening 16.

Throughout the operational description numerous references have been made to the air motor 10. Other means of rotating the rollers 13 and 52 are entirely feasible, however, and nothing in this description is intended to place any limitation on the manner of obtaining such rotary motion.

Having described only a typical form of the invention we do not wish to be limited to the specific details herein set forth, but wish to reserve to ourselves any variations or modifications that may appear to those skilled in the art and fall within the scope of the following claims.

We claim:

1. A machine for threading a bunched group of wires through flexible and stretchable tubing, comprising a wire guide for aligning the wires in substantially parallel spaced relationship, a pair of cooperating rollers engaging the wires after their passage through the guide for advancing the spaced parallel wires, means for driving said rollers, means for gathering said advancing wires into a compact bunch after passing the rollers and guiding said compact bunch into the tubing, and means for introducing pneumatic pressure into the tubing for expanding the same about the advancing wires.

2. A machine for threading a bunched group of wires through flexible and stretchable tubing, comprising a wire guide for aligning the wires in substantially parallel spaced relationship, a pair of cooperating rollers engaging the wires after their passage through the guide for advancing the spaced parallel wires, means for driving said rollers, means for gathering said wires into a compact bunch after passing between the rollers and directing the wires into the tubing, means for introducing pneumatic pressure into the tubing for expanding the same about the bundle of advancing wires and means for feeding a dry lubricant into the last mentioned means to lubricate the wires for movement through the tubing.

3. A machine for threading a bunched group of wires through flexible and stretchable tubing, comprising a wire guide having a plurality of spaced openings each receiving a wire to align the wires in substantially parallel spaced relationship, a pair of cooperating rollers engaging the wires after their passage through the openings for advancing the spaced parallel wires, means for driving said rollers, means for gathering said wires into a compact bunch and directing the same into the tubing, means for introducing pneumatic pressure into the tubing for expanding the same about the bundle of wires, and means spaced between the rollers and last named means for sealing about the bundle of wires to prevent the excessive loss of said pressure.

4. A machine for threading a bunched group of wires through flexible and stretchable tubing, comprising a wire guide for aligning the wires in substantially parallel spaced relationship, a pair of cooperating rollers acting on the wires after their passage through the guide for advancing the spaced parallel wires, means for yieldingly loading said rollers to engage and drive said wires, means for gathering said wires into a compact bunch and guiding the same into the tubing after the wires leave the rollers, and means for introducing pneumatic pressure into the tubing for expanding the same about the bundle of wires.

5. A machine for threading a plurality of wires through flexible stretchable tubing comprising a base, a guide plate on the base having spaced openings each for the passage of a wire, the openings serving to direct the wires in spaced parallel relation, mounting means on the base, a pair of rollers rotatably supported on the mounting means to have the parallel wires pass therebetween and cooperable with the wires, motor means on the base to rotate the rollers so that the rollers draw the wires through said openings toward the rollers and to advance the wires away from the rollers, a tubular block on the base spaced from the rollers to receive the wires as they advance from the rollers and serving to gather the wires into a compact bundle, means for attaching an end of a flexible tubing to the tubular block so as to receive the advancing wire bundle, means in the block spaced from the tube attaching means for sealing about the wire bundle, and means for introducing air under pressure into the tubular block in the region between the seal means and said attaching means to flow into the tubing and expand the same for ready reception of the wire bundle.

References Cited in the file of this patent

UNITED STATES PATENTS

| | | |
|---|---|---|
| 1,258,706 | Porath | Mar. 12, 1918 |
| 1,547,250 | Wilson | July 28, 1925 |
| 1,664,231 | Thomas | Mar. 27, 1928 |
| 1,712,264 | Gammeter | May 7, 1929 |
| 1,993,110 | Myers | Mar. 5, 1935 |
| 2,033,632 | Hawksley | Mar. 10, 1936 |
| 2,359,532 | Searle | Oct. 3, 1944 |
| 2,454,290 | Payne | Nov. 23, 1948 |
| 2,550,564 | Hutton | Apr. 24, 1951 |
| 2,585,484 | Menes | Feb. 12, 1952 |
| 2,680,086 | Hollingsworth et al. | June 1, 1954 |
| 2,720,475 | Seiger | Oct. 11, 1955 |

FOREIGN PATENTS

| | | |
|---|---|---|
| 330,731 | Great Britain | June 19, 1930 |
| 758,830 | France | Nov. 7, 1933 |